April 1, 1969 M. BIRNBAUM 3,436,682

MULTIVIBRATOR SYSTEM FOR PRODUCING WIDTH-MODULATED PULSES

Filed Dec. 1, 1965 Sheet 1 of 2

United States Patent Office 3,436,682

Patented Apr. 1, 1969

3,436,682

MULTIVIBRATOR SYSTEM FOR PRODUCING WIDTH-MODULATED PULSES

Martin Birnbaum, Paris, France, assignor to Schneider Radio-Television, Ivry, Val-de-Marne, France, a corporation of France Filed Dec. 1, 1965, Ser. No. 510,896
Claims priority, application France, Feb. 4, 1965, 4,346
Int. Cl. H03k 7/08
U.S. Cl. 332—9 3 Claims

ABSTRACT OF THE DISCLOSURE

A multivibrator system having two transistors which are interconnected to operate in alternation. A condenser is connected between the transistors and it has a discharge period which defines the duration of the pulses. The collector of an auxiliary transistor is connected to the condenser while its base and emitter are connected to respective constant voltage sources. The modulating voltage supply is connected to the collector of the auxiliary transistor through the intermediary of a grounded condenser and a diode which are connected at a common point to said modulating voltage supply.

This invention relates to a circuit for pulse width modulation, i.e., to apparatus supplying output pulses of a constant amplitude at moments which have been defined by control pulses, said constant amplitude pulses having a width depending on the instantaneous value of a modulating voltage.

It is well-known that modulating circuits of such a type may incorporate a nonstable multivibrator wherein the duration of the maintenance of the multivibrator in its astable position is defined by the discharge of a condenser, which duration governs the width of the pulse produced.

In the accompanying drawings, I have illustrated in FIG. 1 a known monostable multivibrator adapted to be used for such a purpose. Said multivibrator includes two transistors 1 and 2 of the PNP type, the collector of the transistor 1 being connected with the base of the transistor 2 through the condenser 3, the discharge of said condenser defining the duration of maintenance of the multivibrator in its astable position. The emitters of the two transistors 1 and 2 are interconnected and are also connected with the positive terminal 5 of a voltage supply 15, the negative terminal of which is grounded. The collectors of the transistors 1 and 2 are furthermore connected through the resistors 6 and 7, respectively, with the negative terminal 4 of a voltage supply 16 of which the positive terminal is grounded.

The return connection of the transistor 2 to the transistor 1 is obtained by a system including a condenser 8 inserted in parallel with the resistor 9 between the base of the transistor 1 and the collector of the transistor 2. A resistor 17 is inserted between the terminal 5 and the base of the transistor 2.

It is a well-known fact that through a suitable selection of its components, the arrangement disclosed operates as a multivibrator, the stable position being that obtained when the transistor 1 is conductive and the transistor 2 is inoperative. In order to provide a trigger in the multivibrator there is inserted between the base of the tansistor 1 and the positive terminal 5, a diode 10 in series with a resistance 11, said diode being located nearer said base than said resistor and allowing current to pass through it in the direction leading from the terminal 5 towards the base of the transistor 1.

The positive control pulses which produce a trigger in the multivibrator are applied to the input terminal 13, which is connected with the point of connection between 10 and 11 through a condenser 12. The output pulses are tapped off the terminal 14 connected with the collector of the transistor 2.

For the stable position of the multivibrator, the condenser 3 is completely discharged since its left-hand terminal is at the same voltage as the terminal 5 as also its right-hand terminal, which latter is connected with the terminal 5 through the resistor 17. When the shifting from the stable to the astable position is executed, the left-hand terminal of the condenser 3 is brought instantaneously to the voltage of the terminal 4 since the transistor 1 is no longer conductive. At this moment, the condenser is still in its discharged condition, so that the voltage of the terminal 4 is transferred entirely onto the right-hand terminal of the condenser and consequently the transistor 2 becomes conductive.

As time passes, the condenser 3 is charged through the resistor 17 and the voltage of the base of the transistor 2 varies gradually from the voltage of the terminal 4 up to the voltage of the terminal 5, which latter voltage is reached at the moment at which the condenser being completely charged, the current flowing through the resistor 17 reaches a value approximating zero. At this moment, the difference in voltage between the base and the emitter of the transistor 2 is very low, which results in elimination of the conductivity through said transistor and returning the multivibrator circuit into its stable position.

There is thus obtained at the point 14 a voltage which is equal to the voltage of the terminal 4 during the period for which the transistor 2 is no longer conductive, that is during the period for which the circuit is in its stable condition, while the voltage at said point 14 is equal to the voltage of the terminal 5 during the period for which said transistor 2 is conductive, that is during the period for which the multivibrator circuit is in its astable condition.

Said phenomenon corresponds to the production on the output terminal 14 of a pulse the peak value of which is equal to the voltage at the terminal 5, while its duration is equal to that required for charging the condenser 3. Said duration is however not proportional to the difference between the voltages appearing on the terminals 4 and 5, since the charging of the condenser is an exponential function and by no means a linear function of time.

According to my invention, the connections of FIG. 1 are modified so as to obtain a practically perfect linearity for the duration of charging of the condenser 3, that is for the width of the pulse collected on the terminal 14 as a function of the instantaneous value of the modulating voltage.

The condenser 3 is no longer charged through the agency of a resistor but by means of a generator feeding a constant intensity current, the charging being executed until the voltage across the terminals of the condenser is equal to the instantaneous value of the modulating voltage.

To this end, the resistor 6 is eliminated and is replaced by the junction between the collector and the emitter of a further transistor which may, for instance, be of the NPN type, the base of said transistor being brought to a predetermined voltage with reference to ground while its emitter is brought to the modulating voltage with reference to ground through a resistor.

The invention is illustrated in the accompanying drawings wherein.

Figure 1:
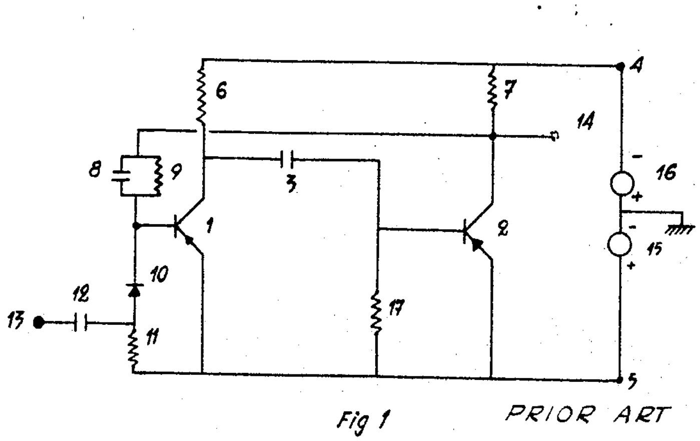
Fig 1 PRIOR ART
FIG. 1 is as already disclosed a wiring diagram of a known arrangement.
Figure 2:
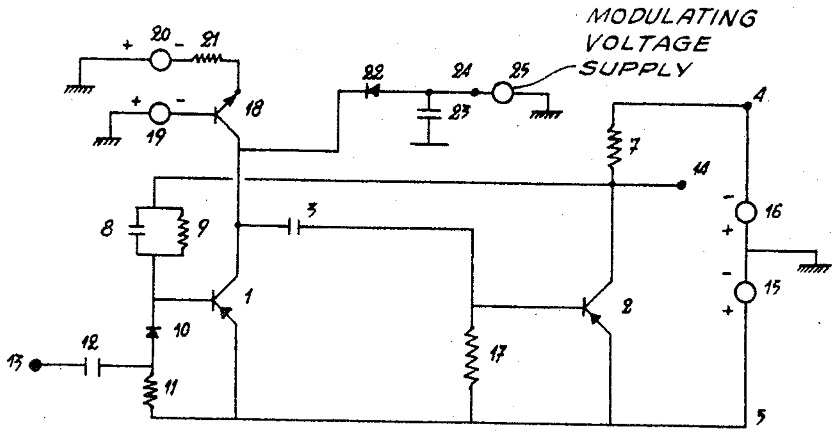
FIG. 2 is a modification thereof according to my invention.

FIG. 2 illustrates the multivibrator according to FIG. 1 modified in accordance with my invention. The parts 1 to 5 and 7 to 17 of FIG. 1 are drawn again in FIG. 2, with the same reference numbers since they play the same part in both wiring diagrams. As disclosed hereinabove, the resistor 6 at FIG. 1 is eliminated and the collector of the transistor 1 which is already connected with the lefthand terminal of the condenser 3 is connected with the collector of a further transistor 18 the base of which is connected with the negative terminal of a voltage supply 19 providing a negative modulating voltage with reference to ground. The emitter of said transistor 18 is connected through a resistance 21 with the negative terminal of a voltage supply 20, the voltage of which is higher than that of 19, the positive terminal of supply 20 being grounded.

It is a well-known fact that a transistor inserted in the manner disclosed feeds a constant current of which the intensity is defined by the values of the voltage fed by the supplies 20 and 19 and of the resistor 21. It is apparent that the modification provided has no action on the shifting of the transistors 1 and 2 between their operative and inoperative conditions, while on the other hand, the condenser 3 is charged in this case exclusively by the current passing between the emitter and collector of the further transistor 18, which current is practically constant. Said charging may be executed until the value of the voltage of the supply 19 is reached at which moment it stops. The modification in the voltage across the terminals of the resistance 17 obtained through said stoppage produces a modification in the voltage of the base of the transistor 2 which is sufficient with a suitable sizing of the different parts, to make the transistor 2 return into the stable condition since a fraction of the charging current passes through said resistor 17 which is inserted in parallel at the moment considered with the junctions between the emitter and the base of the transistor 2.

The connections shown in FIG. 2 allow charging the condenser 3 in accordance with a linear law and stopping said charging at the moment at which the voltage at the terminal of the condenser reaches the value of the voltage of the supply 19, but as may be found experimentally, the moment at which the kick is obtained depends not only on the instantaneous value of the voltage of the supply 19, but also on the values of the voltages of the supplies 15, 16 and 20 which it is necessary to stabilize. Furthermore, the intensity of the current depends on the value of the modulating voltage fed by the supply 19.

Now, according to a further feature of my invention, said drawbacks are overcome by resorting to a source of modulation constituted no longer by the supply 19 which becomes a supply of voltage of an unvarying value, but by an independent supply. Said result is reached by incorporating with the connections which have just been disclosed, a voltage comparator which compares the voltage of the collector of the transistor 1 with the instantaneous value of the modulating voltage, which is obtained through two further members which are also illustrated in FIG. 2.

Said members are a diode 22 and a condenser 23 inserted in series between the collector of transistor 1 and ground, said diode allowing current to pass from the condenser towards the collector and being inserted between the collector and the condenser. The point common to said condenser and diode forms the terminal 24 which is connected with a terminal of the supply 25 feeding the modulating voltage, the other terminal of said supply 25 being grounded.

The supply 19 is selected so as to provide a voltage the absolute value of which is larger than the maximum voltage of the supply 25. It is readily apparent that, with such arrangement, the diode 22 becomes conductive as soon as the voltage at the terminal of the condenser 3 reaches the instantaneous value of the voltage from the supply 25, this being ascribable to the fact that the voltages considered are negative; at this moment, a fraction of the current of a constant intensity supplied by the transistor 18 serves for charging the condenser 23. This results in a reduction of the intensity of the current passing through the resistor 17 and, as in the case in FIG. 1, said drop in intensity, for a suitable sizing of the different parts is sufficient for returning the circuit into its stable condition.

The arrangement illustrated in FIG. 2 which is thus improved by the incorporation of the members 22 and 23, shows still further limitations due to the following phenomena: the resistance of the junctions between the collector and the emitter of the transistor 18 is not infinite and the resistance in the direction for which the diode is conductive is not different from zero.

On the other hand, the width of the pulses collected at the terminal 14 is not proportional to M, which is the instantaneous value of the voltage of the supply 25 but to the difference $E-M$, E being the constant value of the voltage of the supply 15.

According to a further feature of my invention and in order to overcome these last-mentioned drawbacks, the modulating means includes two systems of the type illustrated in FIG. 2; in one of said systems, the terminal 24 is connected with the supply of modulating voltage, which voltage is to be transformed into a pulse duration, while in the other system the terminal 24 is grounded. Furthermore, the output pulses are applied to an anti-coincidence circuit supplying at its output a pulse the duration of which is equal to the difference between the duration of the two pulses applied to its inputs.

Figure 3:
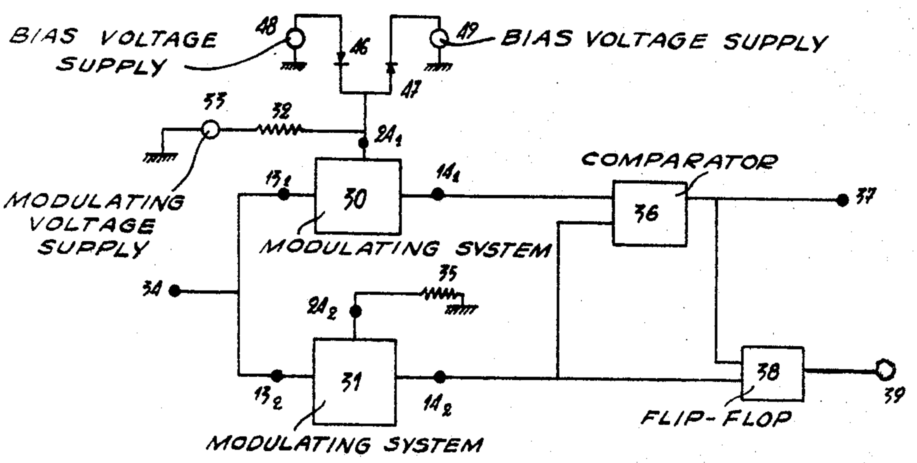
FIG. 3 is a further embodiment of my invention.

FIG. 3 illustrates the complete wiring diagram according to my invention, incorporating these and further improvements to be described hereinafter.

In FIG. 3, two systems 30 and 31 are illustrated which are similar to the modulator illustrated in FIG. 2. The system 30 is provided with terminals $\mathbf{13_1}$, $\mathbf{14_1}$ and $\mathbf{24_1}$ while the system 31 is provided with corresponding terminals $\mathbf{13_2}$, $\mathbf{14_2}$ and $\mathbf{24_2}$, said different terminals being similar to the corresponding terminals 13, 14 and 24 of the modulator of FIG. 2.

As will be readily understood, the terminals $\mathbf{13_1}$ and $\mathbf{13_2}$ are both connected with a terminal 34 which receives the pulses initiating the triggers of the multivibrator, which pulses are thus applied simultaneously to both modulating systems 30 and 31. The terminal $\mathbf{24_1}$ of the modulating system 30 is connected through a resistor 32 with the supply of modulating voltage 33 while the other terminal of said supply is grounded. The terminal $\mathbf{24_2}$ is grounded through a resistor 35. Preferably, the systems 30 and 31 are fed by the same supplies 15, 16, 19 and 20 and are constructed as similar as possible.

It is apparent that, under such conditions, the system 30 supplies at its output terminal $\mathbf{14_1}$ a pulse of a width proportional to the difference $E-M$, E being the voltage of the supply 15 forming part of the system, and M the instantaneous value of the modulating voltage of the supply 33.

On the other hand, the modulating system 31 provides, at its output terminal $\mathbf{14_2}$, a pulse the width of which is proportional to E, while the coefficients of proportionality are the same in both systems by reason of their component parts being identical.

The output pulses $\mathbf{14_1}$ and $\mathbf{14_2}$ are applied to a comparing means 36 which produces at its output terminal 37 a pulse, the duration of which is equal to the difference in duration between the pulses appearing at the terminals $\mathbf{14_1}$ and $\mathbf{14_2}$ and this results in the duration of said pulse obtained at 37 being directly proportional to M.

Figure 4:
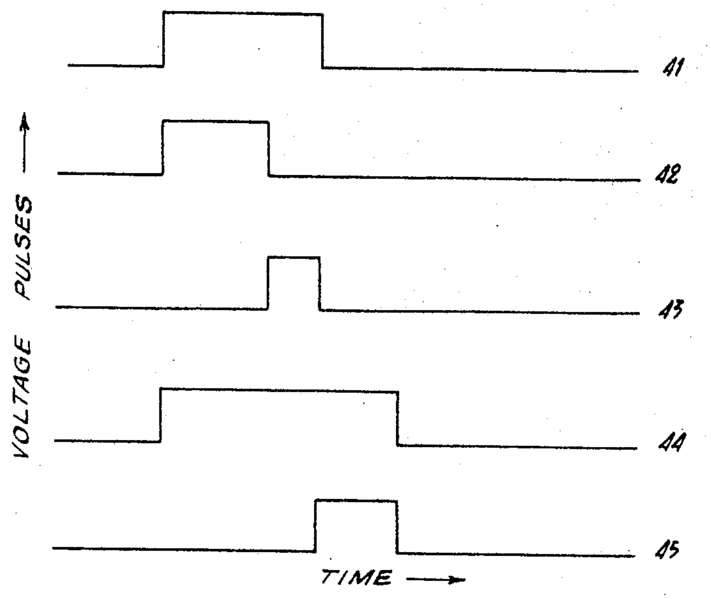
FIG. 4 is an explanatory graph.

FIG. 4 is an explanatory graph illustrating this operation. 41 designates the pulse appearing at the terminal $\mathbf{14_1}$ of the system 31 which may be termed a reference modulating system and 42 designates the pulse produced by the system 30 forming the measuring modulating system.

In the case where the voltage of the supply 33 has a positive instantaneous value, there is obtained at the output of the comparator 36 a pulse 43 starting at the moment at which the pulse 42 stops and stopping at the same time as 41. In contradistinction, in the case when the instantaneous voltage of the supply 33 is negative, the pulse illustrated at 44 which is obtained at $14_1$ is broader than the pulse 41 at $14_1$ and consequently the pulse 45 appearing at the terminal 37 begins at the end of 31 and stops at the same time as 44.

The fact that, in the case of a positive instantaneous value of the modulating voltage, the pulse 43 stops together with the pulse 41 while in contradistinction, in the case of a negative instantaneous value for the modulating voltage, the resulting pulse 45 at the terminal 37 stops after the pulse 41 of the reference modulating system, is used for obtaining an indication as to the polarity of the instantaneous value of the modulating voltage. It is sufficient to apply the pulses at the output terminals of 31 and 36 to a flip-flop 38 controlling an indicator member 39 which allows obtaining the desired result, the flip-flop providing the indication as to polarity, depending as to whether the pulse at the output of 36 exists or does not exist at the moment at which the pulse at the output of 31 stops.

FIG. 3 shows also an arrangement for protection against fortuitous overvoltages, said arrangement being constituted by two diodes 46 and 47 inserted in opposite directions, two terminals of said diodes being connected in parallel with the terminal $24_1$ while the two other terminals are grounded through the supplies 48 and 49 feeding biasing voltages of suitable values.

It is apparent that the modulating system described allows resorting to a modulating voltage adapted to vary between positive and negative values while providing at any moment an indication of the polarity of said modulating voltage, which is of interest for certain applications.

The use of two elementary modulating system 30 and 31 allows obtaining a double operation similar to a double weighing operation, which eliminates the errors in measurement which are ascribable to the imperfect operation of a simple modulating system while the performances of the whole arrangement are considerably improved in spite of the ageing of the component parts and also in spite of the modifications in voltage of the different supplies such as 16, 19 and 20.

What I claim is:

1. A multivibrator system producing width-modulated pulses under the action of a modulating current from a voltage source, said system comprising: two transistors each including a base, emitter and collector, means interconnecting the transistors to operate in alternation, a DC supply connected to said transistors, a condenser connected between the collector of one of the transistors and the base of the other of the transistors and having a discharge period which defines the duration of the pulses, said DC supply having one pole connected to the emitter and base of said transistors and another pole connected to the collector of said other transistor, and means providing linearity of the pulse duration with reference to the voltage of the modulating current source and including an auxiliary transistor, the collector of which is connected to said condenser, and means feeding the auxiliary transistor with the modulating voltage and with a constant voltage, the latter means comprising a supply of constant voltage the absolute value of which is higher than the maximum value of the modulating voltage, said supply of constant voltage being connected with the base of the auxiliary transistor and the voltage source of modulating current being connected to the collector of the auxiliary transistor.

2. A system as claimed in claim 1 wherein said means which feeds the auxiliary transistor with the modulating voltage and the constant voltage further comprises a grounded condenser connected to said voltage source of modulating current and a diode connected to said grounded condenser and said voltage source of modulation current, said diode also being connected to said collector of the auxiliary transistor, and means for biasing the emitter of the auxiliary transistor.

3. In combination with a multivibrator system as claimed in claim 1: a further reference modulating system identical to that of said multivibrator system, a comparator having two inputs connected to respective outputs of the two systems, the comparator having an output providing a pulse the duration of which is directly proportional to the absolute instantaneous value of the modulating voltage, and a flip-flop fed by said comparator and by the reference modulating system to indicate at any moment the polarity of the pulse at the output of the comparator.

References Cited

UNITED STATES PATENTS

| | | | |
|---|---|---|---|
| 3,249,895 | 5/1966 | Corney | 332—9 |
| 3,264,626 | 8/1966 | Mounce. | |
| 3,286,200 | 11/1966 | Foulger | 332—1 |

OTHER REFERENCES

Fulcher: "Pulse Generator," RCA Technical Notes, No. 636, August 1965.

ALFRED L. BRODY, *Primary Examiner.*

U.S. Cl. X.R.

307—265, 273; 325—142; 328—66, 111, 112; 332—14